United States Patent [19]

Sichel

[11] 4,425,527

[45] Jan. 10, 1984

[54] OPTICAL FILTERS COMPRISING PYROLYZED POLYIMIDE FILMS AND LAMP

[75] Inventor: Enid K. Sichel, Lincoln, Mass.

[73] Assignee: GTE Laboratories Incorporated, Waltham, Mass.

[21] Appl. No.: 276,449

[22] Filed: Jun. 22, 1981

[51] Int. Cl.³ .............................................. H01J 61/40
[52] U.S. Cl. ................................................... 313/112
[58] Field of Search .................. 313/112; 350/1.6, 1.7, 350/311; 252/587, 582

[56] References Cited

U.S. PATENT DOCUMENTS 2,834,689  5/1958  Jupnik ................................ 350/1.6
3,179,634  4/1965  Edwards ............................. 428/379
3,253,504  5/1966  Vollmer .............................. 313/112

OTHER PUBLICATIONS

*Journal of Applied Physics;* "The Optical Properties of Kapton:Measurement and Applications", Arakawa et al.; May 1981, vol. 52, No. 5, pp. 3579-3582.

*Journal of Polymer Science;* "The Nature of Dielectric Losses in H-Film", Wrasidlo; Nov. 1973, vol. 11, No. 11, pp. 2143-2152.

*Primary Examiner*—David K. Moore
*Assistant Examiner*—Sandra L. O'Shea
*Attorney, Agent, or Firm*—J. Stephen Yeo; Jerry F. Janssen

[57] ABSTRACT

Selective optical absorption filters which transmit infrared light and absorb or partially reflect visible light comprise thin films of partially pyrolyzed polymeric aromatic pyromellitimides. The filters are characterized by a metallic luster and maximum light transmittance above about 2 μm wavelength.

A lamp is disclosed having a reflective filter disposed behind the filament to reflect visible light forward through the front portion of the lamp while transmitting infrared light rearward through the back portion of the lamp.

8 Claims, 3 Drawing Figures

OPTICAL FILTERS COMPRISING PYROLYZED POLYIMIDE FILMS AND LAMP

BACKGROUND OF THE INVENTION

This invention relates to optical filters. More particularly, it is concerned with infrared light transmissive, visible light absorptive optical filters.

Selective optical absorption filters are used in a variety of applications including video displays, analytical instrumentation, photographic equipment, and light sources, both for color correction and for heat dissipation. The term "selective optical absorption filter" as used herein is defined as a medium which substantially absorbs certain selected wavelengths of light while substantially transmitting others. The term "light" is intended to include electromagnetic radiation in the near ultraviolet region of the spectrum, the visible region, and the near infrared region. Somewhat arbitrarily, the near-ultraviolet region of the electromagnetic spectrum may be considered to cover wavelengths from about 0.3 $\mu$m to 0.4 $\mu$m, the visible region to cover from 0.4 $\mu$m to 0.7 $\mu$m, and the near infrared region to cover from 0.7 $\mu$m to about 5.0 $\mu$m.

High temperature light sources such as incandescent lamp filaments, carbon arcs, high intensity discharge lamps, etc., radiate a substantial portion of their energy output in the near-infrared region of the electromagnetic spectrum. Because of the heating effects of near-infrared radiation, it is desirable in certain applications such as photographic projector lamps and the like to dissipate these longer non-visible wavelengths of light to protect the heat-sensitive photographic medium in the projector from damage.

Selective optical absorption filters have been employed in a variety of devices to dissipate the infra-red heat generating wavelengths of light from high temperature light sources. In one arrangement, a selective optical filter which transmits visible wavelengths and absorbs infrared wavelengths is placed between the light source and the object to be illuminated. In yet another arrangement, a reflective selective optical absorption filter is placed behind the light source, frequently forming a part of the lamp housing. The reflective filter transmits unwanted infrared wavelengths of light out the back portion of the lamp housing while reflecting the desired visible wavelengths of light forward through the front portion of the lamp housing.

Selective optical absorption filters have been fabricated in the prior art generally as dye filters or as quarter wave filters. Dye filters comprise a material which absorbs the unwanted light wavelengths dispersed in a medium which is transparent to the desired wavelengths. Frequently, dye filters do not possess the necessary thermal stability for applications involving heat dissipation in high temperature light sources.

Quarter wave filters comprise one or more films of a thickness equal to a quarter of the wavelength, or some small integral multiple thereof, of the light to be removed from the light stream. If a wide band of wavelengths is to be filtered, a number of quarter wave films must be deposited on the filter substrate.

SUMMARY OF THE INVENTION

In accordance with the present invention, a thermally stable infrared light transmissive, visible light absorptive optical filter comprises a film of the thermal decomposition product formed by heating an aromatic polymeric pyromellitimide at a temperature of between about 600° C. and 700° C. for a period of from 2 to 6 hours in an inert gas atmosphere. The film of thermal decomposition product is characterized by a metallic sheen and maximum light transmittance above about 2 $\mu$m wavelength.

In one embodiment of the present invention, in an incandescent lamp comprising an incandescent filament, a selective optical filter behind and in reflecting relationship to the filament to reflect visible light directly through the forward portion of the lamp and to transmit infrared light, an enclosing light-transmitting envelope around said filament and said reflector, and an inert gas filling said envelope, the improvement wherein said selective optical filter comprises a film of the thermal decomposition product formed by heating a film of polymeric pyromellitimide at a temperature of between about 600° C. and 700° C. for a period of from 2 to 6 hours in an inert gas atmosphere.

For a better understanding of the present invention, together with other and further objects, advantages and capabilities thereof, reference is made to the following disclosure and appended claims in connection with the above-described drawings.

DETAILED DESCRIPTION

Selective optical absorption filters in accordance with the present invention comprise thin films of the material resulting from the partial pyrolysis of aromatic pyromellitimide copolymers. By the term "aromatic pyromellitimide copolymers" is meant the class of alternating copolymers formed by the chemical reaction of pyromellitic dianhydride (1,2,4,5-benzenetetracarboxylic acid dianhydride) and an aromatic diamine; that is a diamine containing at least one benzene ring. Preferred aromatic diamines include the isomeric forms of diaminobenzene (including paraphenylene diamine and metaphenylene diamine), diaminobiphenyl (including 4,4'-diaminobiphenyl and 3,3'-diaminobiphenyl), diaminodiphenyl methane (including 4,4'-diaminodiphenyl methane and 3,3'-diaminodiphenyl methane), and diaminodiphenyl ether (including 4,4'-diaminodiphenyl ether and 3,3'-diaminodiphenyl ether). Details of the preparation of polymeric pyromellitimides is disclosed in U.S. Pat. Nos. 3,179,614 and 3,179,634.

It has been found in accordance with the present invention that partially pyrolyzed films of aromatic polymeric pyromellitimides are substantially transparent to infrared wavelengths above about 2 $\mu$m while absorbing or partially reflecting wavelengths less than about 2 $\mu$m. To prepare optical filters of the present invention, a film of aromatic polymeric pyromellitimide of thickness less than about 10 $\mu$m, preferably about 1–5 $\mu$m, is cast on an appropriate substrate by spraying, dipping, flow coating, or spin coating in accordance with techniques well known in the coating art. To prepare a selective absorption filter in accordance with the present invention which absorbs or reflects visible light while substantially transmitting near infrared, the polymeric pyromellitimide film is cast on a substrate which is substantially transparent to infrared wavelengths less than about 5.0 μm such as glass or a polycrystalline ceramic such as alumina or yttria.

Figure 1:
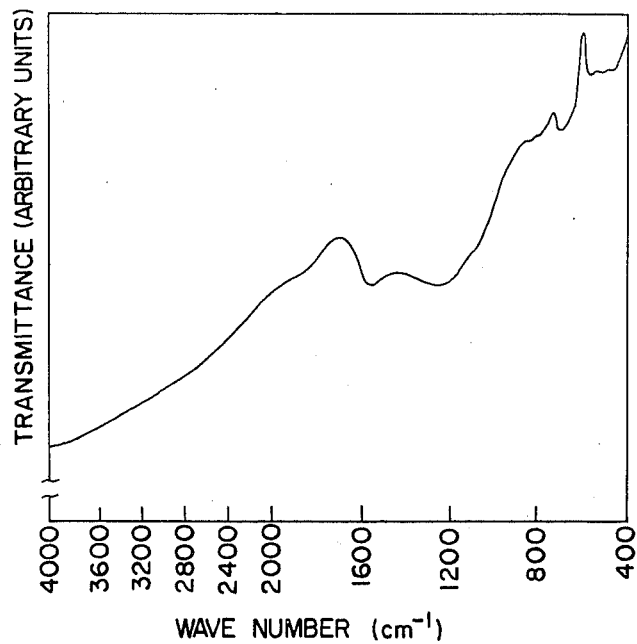
FIG. 1 is an infrared spectrum of a filter in accordance with the present invention.

Subsequent to coating the infrared transparent substrate with a polymeric pyromellitimide film, the film is partially pyrolyzed to produce a filter in accordance with the present invention. Pyrolysis is carried out for a period of from 2 to 6 hours at a temperature of from about 600° C. to about 700° C. in an inert gas atmosphere such as argon or the like to prevent either oxidation or reduction of the film during pyrolysis. This pyrolysis step converts the polymer film from that of a pale yellow, transparent film of organic material having a well-defined chemical composition and structure, to that of a gray or black film, of indeterminant chemical structure, opaque to visible light and having a metallic luster. As can be seen in FIG. 1, the infrared absorption spectrum of a filter in accordance with the present invention shows only broad absorption bands characteristic of a "metallic" state rather than the sharp, narrow absorption bands attributable to stretching and bending vibrational modes in organic molecules.

Figure 2:
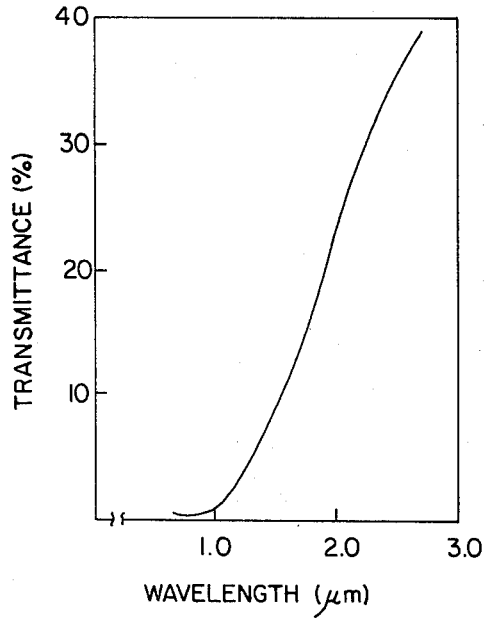
FIG. 2 is a graph indicating transmittance in the infrared region of the spectrum of a filter in accordance with the present invention.

While not espousing one theory to the exclusion of others, it is believed that pyrolysis of a polymeric aromatic pyromellitimide film under conditions described above results in a film comprising islets of carbon distributed in an organic molecular matrix of highly delocalized electronic structure. The pyrolyzed film possesses many of the properties of a metal or metalloid including luster and appreciable electrical conductance. The filter has a reflectance of about 15% over the visible region while substantially absorbing the balance. As can be seen by reference to FIG. 2, however, these filters are substantially transparent to near infrared light, having a transmittance rapidly and monotonically increasing at wavelengths above about 1 μm.

In fabricating selective optical absorption filters of this invention, it is preferred that the polymeric pyromellitimide film which is partially pyrolyzed to form the filter be composed of a copolymer derived from pyromellitic dianhydride and an aromatic diamine selected from the group recited above. It is believed that the chemical stability of benzene rings confers upon the partially pyrolyzed film the requisite thermal stability toward further degradation required in applications where filters of this invention are employed in high temperature environments such as heat dissipation from incandescent lamps. Moreover, it is believed that an aromatic pyromellitimide film possesses a chemical structure readily converted to a material having, in part, a graphite structure. Of the various polymeric aromatic pyromellitimides useful in preparing filters of this invention, copolymers of pyromellitic dianhydride and one or more of the isomeric diaminodiphenyl ethers is preferred, such as 4,4'-diaminodiphenyl ether.

Figure 3:
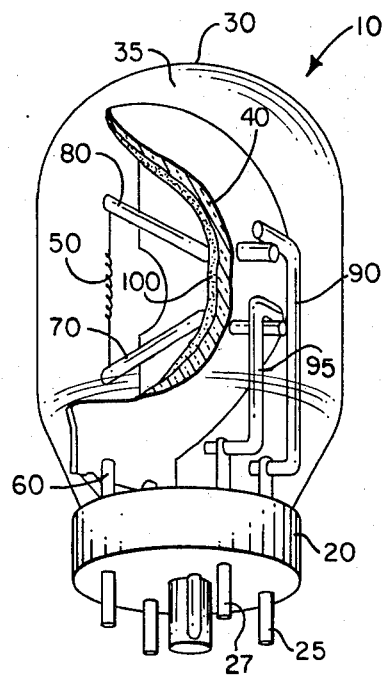
FIG. 3 is a partially cutaway perspective view of a lamp in accordance with one embodiment of the present invention.

Referring to FIG. 3, there is shown a lamp in accordance with one embodiment of the invention. The lamp 10 comprises a base member 20 with electrically insulated and sealed pins 25 and 27 which connect elements internal to the lamp to an external power source. A transparent envelope 30 encloses and seals a chamber 35 filled with an inert gas. Posts 90 and 95 attached to pins 25 and 27 connect to members 70 and 80 which support filament 50. The lateral support members 70 and 80 project through openings in a selective optical absorption-reflection filter disposed behind filament 50. The filter comprises a curved substrate 40 of glass, quartz, or polycrystalline ceramic transparent to near infrared wavelengths less than about 5.0 μm upon which a thin film 100 of an infrared transmissive material in accordance with this invention is deposited. The film 100 comprises a film of less than about 10 μm thickness of the thermal decomposition product formed by heating an aromatic polymeric pyromellitimide at a temperature of between about 600° C. to about 700° C. for a period of between 2 to 6 hours in an inert gas atmosphere.

While there has been shown and described what are at present considered the preferred embodiments of the invention, it will be obvious to those skilled in the art that various changes and modifications may be made therein without departing from the scope of the invention as defined by the appended claims.

What is claimed is:

1. An infrared light transmissive, visible light absorptive optical filter comprising a film of the thermal decomposition product formed by heating an aromatic polymeric pyromellitimide at a temperature of between about 600° C. to about 700° C. for a period of between about 2 to 6 hours in an inert gas atmosphere, said film of thermal decomposition product characterized by maximum light transmittance above about 2 μm wavelength.

2. An optical filter in accordance with claim 1 wherein said polymeric polymellitimide has the repeating unit

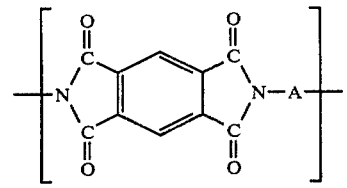

wherein A is selected from the group consisting of

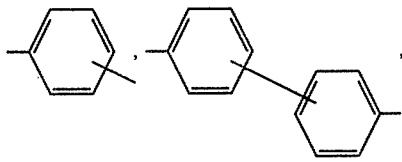

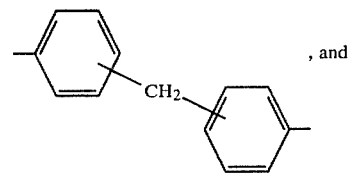

, and

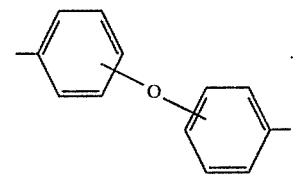

3. An optical filter in accordance with claim 2 comprising a film of said thermal decomposition product of a thickness less than about 10 μm on a substrate transparent to light of wavelengths less than 5 μm.

4. An optical filter in accordance with claim 2 wherein said polymeric pyromellitimide has the repeating unit

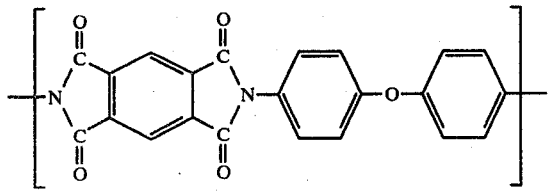

5. An optical filter in accordance with claim 3 having a visible light reflectance of at least 15%.

6. In a lamp comprising an incandescent filament, a selective optical absorption filter in back of and in reflecting relationship to said filament to reflect visible light directly through the forward portion of the lamp and transmit infrared radiation, an enclosing light-transmitting envelope around said filament and said filter, the improvement wherein said selective optical absorption filter comprises a film of the thermal decomposition product formed by heating a polymeric pyromellitimide at a temperature of about 600° C. to about 700° C. for a period of about 2 to 6 hours in an inert gas atmosphere said film of thermal decomposition product characterized by maximum light transmittance above about 2 μm wavelength.

7. A lamp in accordance with claim 6 wherein said polymeric pyromellitimide has the repeating unit:

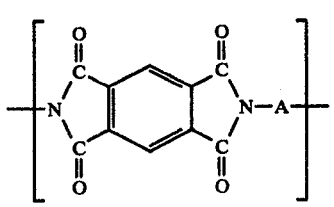

wherein A is selected from the group consisting of:

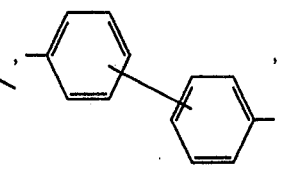

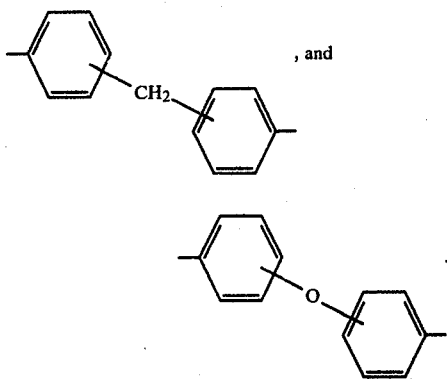

, and

8. A lamp in accordance with claim 7 wherein said selective optical absorption filter comprises a film of said thermal decomposition product of thickness less than about 10 μm on a substrate transparent to light of wavelengths less than about 5 μm.

* * * * *